(12) United States Patent
Hamilton et al.

(10) Patent No.: US 7,842,152 B2
(45) Date of Patent: Nov. 30, 2010

(54) METHOD OF MAKING RFID DEVICES

(75) Inventors: Kevin S. Hamilton, Oak Park, CA (US);
Mischa Reis, Los Angeles, CA (US);
Ronald F. Sieloff, Chardon, OH (US)

(73) Assignee: Avery Dennison Corporation,
Pasadena, CA (US)

( * ) Notice: Subject to any disclaimer, the term of this patent is extended or adjusted under 35 U.S.C. 154(b) by 0 days.

(21) Appl. No.: 11/507,900

(22) Filed: Aug. 22, 2006

(65) Prior Publication Data

US 2007/0039687 A1 Feb. 22, 2007

Related U.S. Application Data

(60) Provisional application No. 60/710,263, filed on Aug. 22, 2005.

(51) Int. Cl.
| | |
|---|---|
| *B29C 65/00* | (2006.01) |
| *B29C 65/02* | (2006.01) |
| *B32B 37/00* | (2006.01) |
| *B32B 38/00* | (2006.01) |
| *B31F 1/00* | (2006.01) |
| *A61F 13/15* | (2006.01) |
| *B32B 3/04* | (2006.01) |
| *B60J 10/00* | (2006.01) |
| *B32B 38/04* | (2006.01) |
| *B32B 38/14* | (2006.01) |
| *G08B 13/14* | (2006.01) |

(52) U.S. Cl. .................... 156/227; 156/64; 156/202; 156/204; 156/216; 156/221; 156/268; 156/269; 156/277; 340/572.1

(58) Field of Classification Search ............... 156/247, 156/268, 269, 277, 216, 64, 196, 199, 200, 156/201, 202, 204, 221, 248, 250; 340/572.1, 340/572.8
See application file for complete search history.

(56) References Cited

U.S. PATENT DOCUMENTS

| | | | |
|---|---|---|---|
| 4,876,535 A | 10/1989 | Ballmer et al. |
| 5,153,983 A | 10/1992 | Oyama |
| 5,430,441 A | 7/1995 | Bickley et al. |
| 5,545,291 A | 8/1996 | Smith et al. |
| 5,557,085 A | 9/1996 | Tyren et al. |

(Continued)

FOREIGN PATENT DOCUMENTS

DE 101 20 625 4/2001

(Continued)

OTHER PUBLICATIONS

Monarch RFID Supplies Solutions, Paxar Americas, Inc., (2004).

(Continued)

*Primary Examiner*—Richard Crispino
*Assistant Examiner*—Brian R Slawski

(57) ABSTRACT

A method of making RFID tags includes printing individualized information to a printable facestock on which an RFID device is attached. Generic information may be preprinted on the facestock before the RFID device is attached. The facestock may be folded over, putting the generic information and individualized information on different sides of the tag. The individualized information may be a function of information obtained by reading or interrogating the RFID device.

16 Claims, 5 Drawing Sheets

U.S. PATENT DOCUMENTS

| | | | |
|---|---|---|---|
| 5,564,888 A | 10/1996 | Doan | |
| 5,621,199 A | 4/1997 | Calari et al. | |
| 5,781,110 A | 7/1998 | Habeger, Jr. et al. | |
| 5,783,856 A | 7/1998 | Smith et al. | |
| 5,824,186 A | 10/1998 | Smith et al. | |
| 5,854,480 A | 12/1998 | Noto | |
| 5,880,695 A | 3/1999 | Brown et al. | |
| 5,904,545 A | 5/1999 | Smith et al. | |
| 5,983,363 A | 11/1999 | Tuttle et al. | |
| 6,001,211 A | 12/1999 | Hiroyuki | |
| 6,052,093 A | 4/2000 | Yao et al. | |
| 6,078,259 A | 6/2000 | Brady et al. | |
| 6,100,804 A | 8/2000 | Brady et al. | |
| 6,107,920 A | 8/2000 | Eberhardt et al. | |
| 6,121,880 A | 9/2000 | Scott et al. | |
| 6,122,492 A | 9/2000 | Sears | |
| 6,130,612 A | 10/2000 | Castellano et al. | |
| 6,145,901 A | 11/2000 | Rich | |
| 6,147,605 A | 11/2000 | Vega et al. | |
| 6,172,609 B1 | 1/2001 | Lu et al. | |
| 6,181,287 B1 | 1/2001 | Beigel | |
| 6,204,764 B1 | 3/2001 | Maloney | |
| 6,206,292 B1 | 3/2001 | Robertz et al. | |
| 6,219,543 B1 | 4/2001 | Myers et al. | |
| 6,236,316 B1 | 5/2001 | Eberhardt et al. | |
| 6,246,326 B1 | 6/2001 | Wiklof et al. | |
| 6,262,692 B1 | 7/2001 | Babb | |
| 6,265,977 B1 | 7/2001 | Vega et al. | |
| 6,274,508 B1 | 8/2001 | Jacobsen et al. | |
| 6,280,544 B1 | 8/2001 | Fox et al. | |
| 6,281,038 B1 | 8/2001 | Jacobsen et al. | |
| 6,291,896 B1 | 9/2001 | Smith | |
| 6,316,278 B1 | 11/2001 | Jacobsen et al. | |
| 6,380,729 B1 | 4/2002 | Smith | |
| 6,392,544 B1 | 5/2002 | Collins et al. | |
| 6,404,339 B1 | 6/2002 | Eberhardt | |
| 6,407,665 B2 | 6/2002 | Maloney | |
| 6,415,978 B1 | 7/2002 | McAllister | |
| 6,417,025 B1 | 7/2002 | Gengel | |
| 6,446,208 B1 | 9/2002 | Gujar et al. | |
| 6,451,154 B1 | 9/2002 | Grabau et al. | |
| 6,480,086 B1 | 11/2002 | Kluge et al. | |
| 6,487,681 B1 | 11/2002 | Tuttle et al. | |
| 6,542,114 B1 | 4/2003 | Eagleson et al. | |
| 6,545,605 B2 | 4/2003 | Van Horn et al. | |
| 6,600,420 B2 | 7/2003 | Goff et al. | |
| 6,611,199 B1 | 8/2003 | Geiszler et al. | |
| 6,624,362 B2 | 9/2003 | Muller | |
| 6,645,327 B2 | 11/2003 | Austin et al. | |
| 6,665,193 B1 | 12/2003 | Chung et al. | |
| 6,677,852 B1 | 1/2004 | Landt | |
| 6,683,254 B1 | 1/2004 | Gunnels | |
| 6,836,215 B1 * | 12/2004 | Laurash et al. | 340/572.1 |
| 6,899,476 B1 * | 5/2005 | Barrus et al. | 400/76 |
| 2001/0006368 A1 | 7/2001 | Maloney | |
| 2001/0053675 A1 | 12/2001 | Plettner | |
| 2001/0054755 A1 * | 12/2001 | Kirkham | 257/678 |
| 2002/0035701 A1 | 3/2002 | Casebolt et al. | |
| 2002/0038267 A1 | 3/2002 | Can et al. | |
| 2002/0145520 A1 | 10/2002 | Maloney | |
| 2003/0062119 A1 * | 4/2003 | Hohberger et al. | 156/277 |
| 2004/0041262 A1 | 3/2004 | Okamoto et al. | |
| 2004/0100413 A1 | 5/2004 | Waldner | |
| 2004/0160233 A1 | 8/2004 | Forster | |
| 2004/0178267 A1 | 9/2004 | Tsirline et al. | |
| 2004/0188010 A1 * | 9/2004 | Chaoui | 156/269 |
| 2004/0238098 A1 * | 12/2004 | Bleckmann et al. | 156/73.1 |
| 2005/0189066 A1 * | 9/2005 | Look et al. | 156/277 |
| 2005/0274800 A1 * | 12/2005 | Chapman et al. | 235/432 |

FOREIGN PATENT DOCUMENTS

| | | |
|---|---|---|
| EP | 1039543 | 3/2000 |
| EP | 0 996 084 | 4/2000 |
| EP | 0996084 A2 * | 4/2000 |
| EP | 0896706 | 6/2000 |
| EP | 1 130 542 | 9/2001 |
| EP | 1086444 | 2/2003 |
| EP | 1 517 285 | 3/2005 |
| FR | 2 760 209 | 4/1998 |
| JP | 2004/187159 | 7/2004 |
| JP | 2004/206479 | 7/2004 |
| JP | 2004/206512 | 7/2004 |
| WO | WO 82/00541 | 2/1982 |
| WO | WO 93/05489 | 3/1993 |
| WO | WO 00/16277 | 3/2000 |
| WO | WO 00/16280 | 3/2000 |
| WO | WO 00/41148 | 7/2000 |
| WO | WO 00/45353 | 8/2000 |
| WO | WO 00/49648 | 8/2000 |
| WO | WO 01/25817 | 4/2001 |
| WO | WO 01/73864 | 4/2001 |
| WO | WO 01/50547 | 7/2001 |
| WO | WO 01/67412 | 9/2001 |
| WO | WO 01/71686 | 9/2001 |
| WO | WO 01/75832 | 10/2001 |
| WO | WO 01/80174 | 10/2001 |
| WO | WO 02/25825 | 3/2002 |
| WO | WO 02/097723 | 12/2002 |
| WO | WO 03/056509 | 7/2003 |
| WO | WO 03/068874 | 8/2003 |
| WO | WO 2004/030148 | 9/2003 |
| WO | WO 2004/044384 | 5/2004 |
| WO | WO 2004/046762 | 6/2004 |
| WO | WO 2004/053721 | 6/2004 |
| WO | WO 2004/072892 | 8/2004 |
| WO | WO 2005/009750 | 2/2005 |
| WO | WO 2005/013179 | 2/2005 |

OTHER PUBLICATIONS

Paxar: The Power of Indentification, Monarch RFID Supplies Solutions, Paxar Americas, Inc., (2006).

RFID Setup Guide & Supply Chart, Paxar Americas, Inc., (2005).

Bar Code and RFID Smart Labels & Tags. Paxar Monarch RFID Smart Labels and Tags, Bar Code Supplies [online]. Retrieved from the Internet <URL: http://www.paxar.com/products/BarcodeRFID/barcode supplies.html>.

International Search Report from corresponding International Application No. PCT/US06/032558.

International Preliminary Report on Patentability and Written Opinion from corresponding International Application No. PCT/US06/032558.

Office Action dated Oct. 29, 2008 from corresponding European Application No. 06801978.5.

Amendment and Response filed on May 8, 2009 from corresponding European Application No. 06801978.5.

* cited by examiner

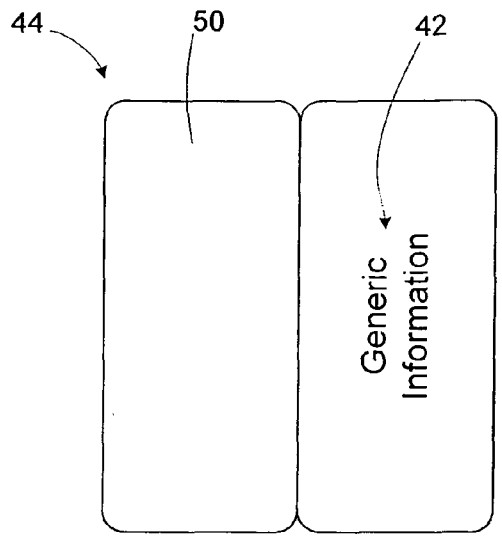
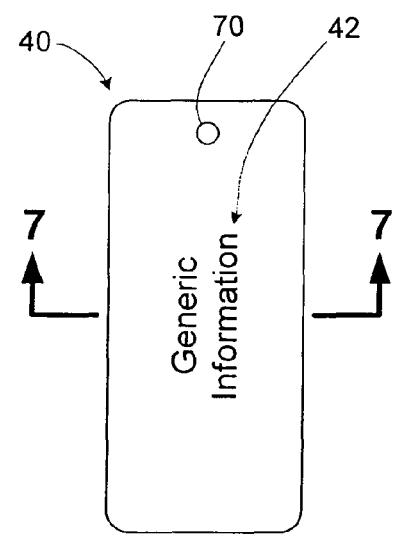
FIG. 3    FIG. 5
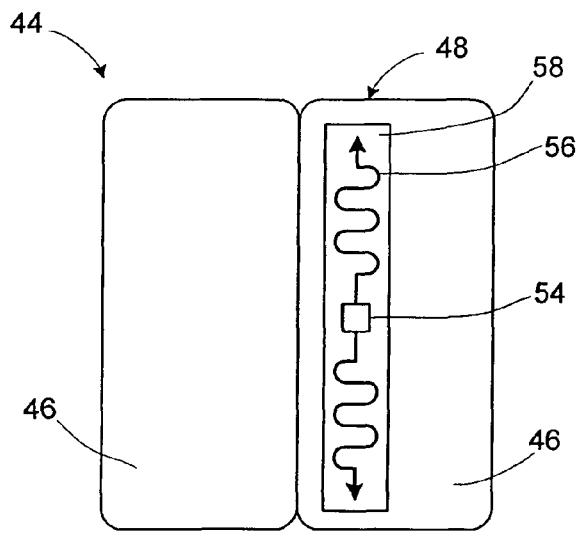
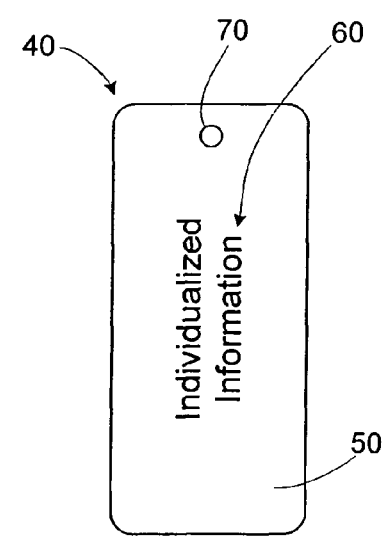
FIG. 4    FIG. 6
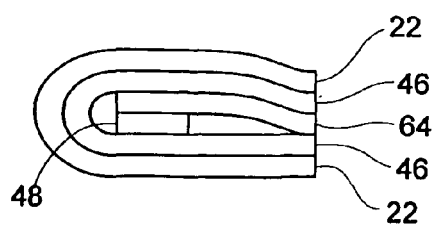
FIG. 7

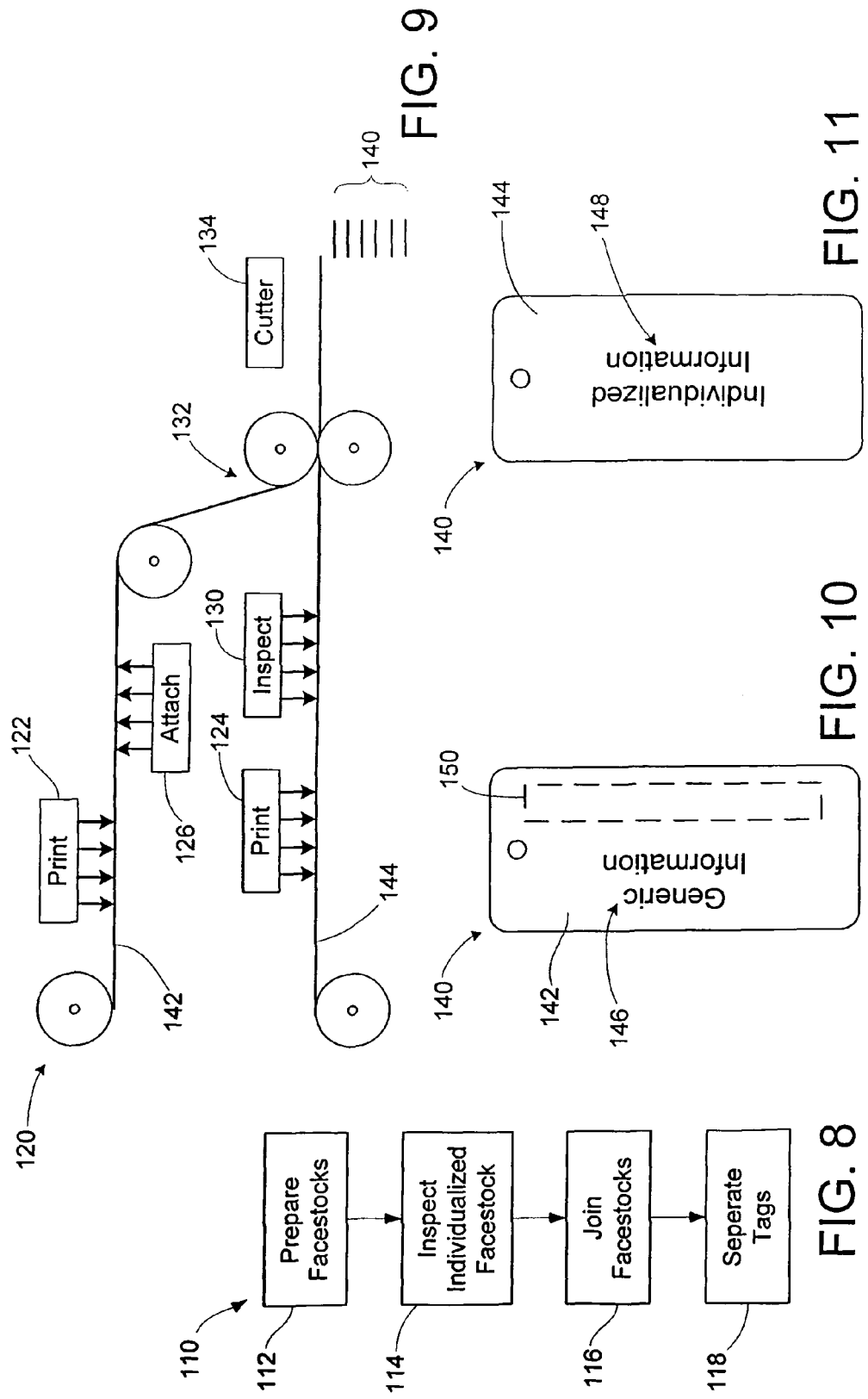

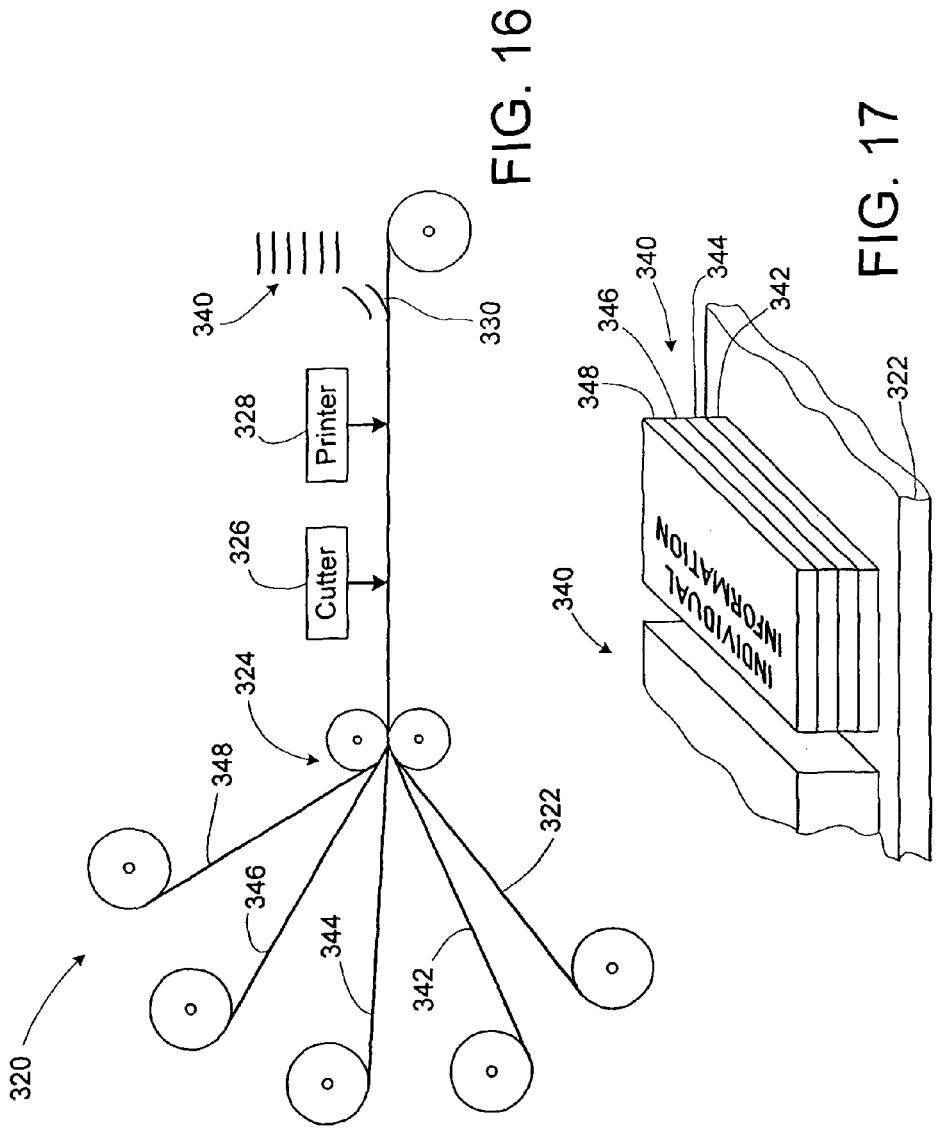
FIG. 16
FIG. 17
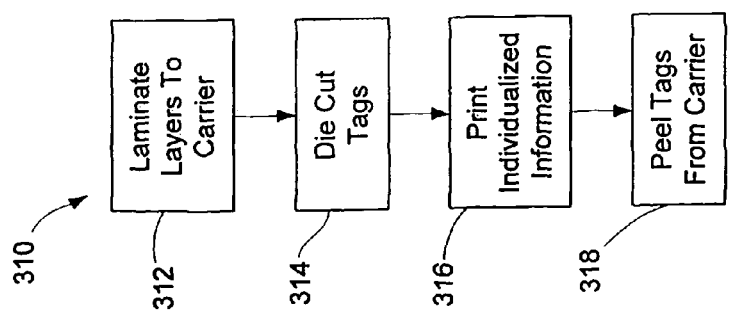
FIG. 15

METHOD OF MAKING RFID DEVICES

This application claims priority under 35 USC 119 to U.S. Provisional Application No. 60/710,263, filed Aug. 22, 2005, which is herein incorporated by reference in its entirety.

BACKGROUND OF THE INVENTION

1. Field of the Invention

The invention relates to the field of methods for making remote identification devices, such as tags for garments.

2. Description of the Related Art

Tags and labels have long been attached to garments intended for retail purpose, to provide information on price, size, and/or features to the consumer, as well as for antitheft purposes. More recently, such tags and labels have begun to incorporate radio frequency identification (RFID) devices therein, to enable detection of the garments at a distance (such as for inventory and antitheft purposes), and/or to allow information regarding the garment, such as price) to be read at a distance. Some examples of RFID tags and labels appear in U.S. Pat. Nos. 6,107,920, 6,206,292, and 6,262,692, all of which are hereby incorporated by reference in their entireties.

Currently, one way of making garment tags incorporating remotely-detectable security devices (such as RFID devices) is to preprint indicia onto card stock. A security device such as an RFID device is then attached to the card stock. The flat stock to sent to a local distribution house that prints the product specific indicia onto the card stock, and then folds the card to produce a tag. Note that the security device is under the preprinted indicia so as to prevent damage during the second printing step.

Improvements in the above methods and devices would be desirable.

SUMMARY OF THE INVENTION

The current invention involves improved methods of making remotely-readable or remotely-detectable devices such as tags for garments, which tags include RFID devices.

According to one aspect of the invention, a paper stock is preprinted with desired repeated (generic) information, and a security device (such as an RFID chip and antenna) is attached to a roll of paper labels on the paper stock. The preprinted repeated or generic information could be any sort of information that is the same from tag to tag, such as a store logo, decorative designs, and/or information signaling the presence of the security device. In a subsequent printing operation, which may be preformed in a different location, with a different printer, and/or at a different time, other information may be printed on another part of the paper labels. This other information may include information corresponding to a particular garment to which the tag is to be attached, such as size, color, or style of the garment. The information may be human readable an/or computer readable. The other information may also include an identifier regarding the particular security device that is part of the tag, for example a serial number corresponding to the particular RFID device. After the printing of the individualized information the final printed label could be folded over a plain card stock and adhered to the card stock to make a final tag.

According to another embodiment of the invention, a pair of facestock streams are laminated together to form the tag. One of the facestock streams is a preprinted paper stock or cardstock, with generic information printed thereon, with a security device (such as an RFID device) attached. The other facestock may be a paper roll upon which the individualized information (see above) for each of the tags is printed. After printing the individualized information the two facestock streams may be attached together, perhaps at the exit of the printer for printing the individualized information. Good side-to-side print registration may be obtained by use of this method. The individualized information may be electronically inspected, prior to the joining of the two facestocks, to verify print quality and/or content. Attachment of preprinted indicia and RFID devices to areas with individualized information that failed inspection could be aborted, in order to avoid wasting RFID devices by attaching them to individualized printed portions that are somehow defective.

According to still another aspect of the invention, a tag is preprinted with generic information, and is subsequently printed with individualized information, including information regarding an RFID device to be attached to the tag either before or after the second printing. The information regarding the RFID device may include a machine-readable or human-readable identifier associated with the RFID device, such as a serial number. The printer for printing the individualized information may be coupled to a reader for interrogating the RFID devices in order to supply at least some of the information for printing the individualized information. Alternatively or in addition, the printer may be coupled to a data storage device, such as computer-readable media, that stores information for printing the individualized information. For instance, the data may include serial numbers of RFID devices listed in the order in which they are supplied to the printer. These RFID devices may be supplied to the printer in a roll format. If the RFID devices are attached following the printing of the individualized information, an inspection of the individualized information may be performed before the attaching, with no RFID device attached for individualized information portions that fail the inspection. A pressure sensitive adhesive (PSA) may be used for attachment of the RFID devices or other security devices.

According to a further aspect of the invention, a number of layers, including a thermal-transfer-printable layer, a preprinted layer, RFID device layer (for example on a suitable polymer such as PET), and an optional cardstock layer, are laminated together onto a carrier material. The laminated layers are then cut into individual tags that are still coupled to the carrier material. A thermal transfer printer is then used to print individualized information into the thermal-transfer-printable layer. Following the thermal transfer printing, the completed tags are separated from the carrier material by peeling them off the carrier material.

According to another aspect of the invention, a method of making an RFID tag includes the steps of: preparing a paper roll material, the preparing including: printing first information on a first face of the roll material; and attaching a plurality of RFID devices to an opposite face of the roll material; after the preparing, printing second information on the first face of the roll material; and folding portions of the paper roll material around portions of cardstock, with the first and second information on respective opposite faces of the resulting tag.

According to yet another aspect of the invention, a method of making an RFID tag includes the steps of: preparing a pair of printable facestocks, one of the facestocks having an RFID device attached thereto; and adhesively joining the facestocks together.

According to still another aspect of the invention, a method of making an RFID tag includes the steps of: obtaining device information from an RFID device; printing individualized information on a facestock, wherein the individualized information is at least in part a function of the device information obtained from the RFID device; and attaching the RFID device to the facestock.

According to a further aspect of the invention, a method of making an RFID tag includes the steps of: laminating plural layers to a carrier material, the plural layers including a plurality of RFID devices and a printable facestock; die cutting the plural layers to produce plural tags on the carrier material; and separating the tags from the carrier material.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 3 is a plan view of a partially-completed portion of an RFID tag made in accordance with the method of FIG. 1;

FIG. 4 is a bottom view of the partially-completed portion of FIG. 3;

FIG. 5 is a plan view of a tag made in accordance with the method of FIG. 1;

FIG. 6 is a bottom view of the tag of FIG. 5;

FIG. 7 is a cross-sectional view of the tag of FIG. 5, across section 7-7 of FIG. 5;

FIG. 8 is a high-level flowchart of steps of a second method of making an RFID tag, in accordance with the present invention;

FIG. 9 is a schematic diagram of a system for carrying out the method of FIG. 8;

FIG. 10 is a plan view of a partially-completed portion of an RFID tag made in accordance with the method of FIG. 8;

FIG. 11 is a bottom view of the partially-completed portion of FIG. 10;

FIG. 15 is a high-level flowchart of steps of a fourth method of making an RFID tag, in accordance with the present invention;

FIG. 16 is a schematic diagram of a system for carrying out the method of FIG. 15; and FIG. 17 is an oblique view of a tag made with the method of FIG. 15.

DETAILED DESCRIPTION

In the various below-described methods of making tags, improvements are made over previous methods in terms of more efficient storage, elimination of process steps, reduction of waste materials, and/or reduction of cost of production.

Figure 1:
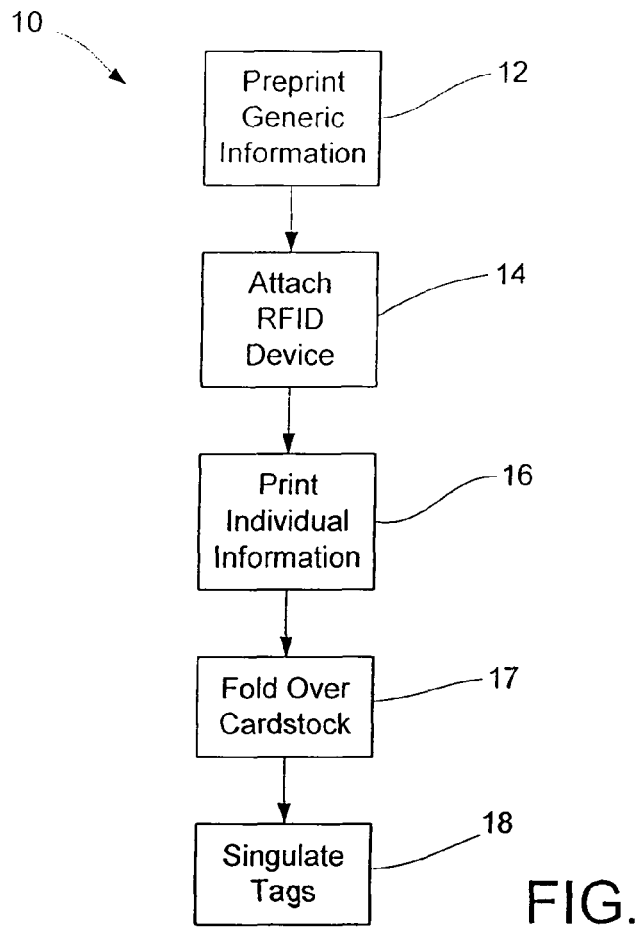
FIG. 1 is a high-level flowchart of steps of a first method of making an RFID tag, in accordance with the present invention.
Figure 2:
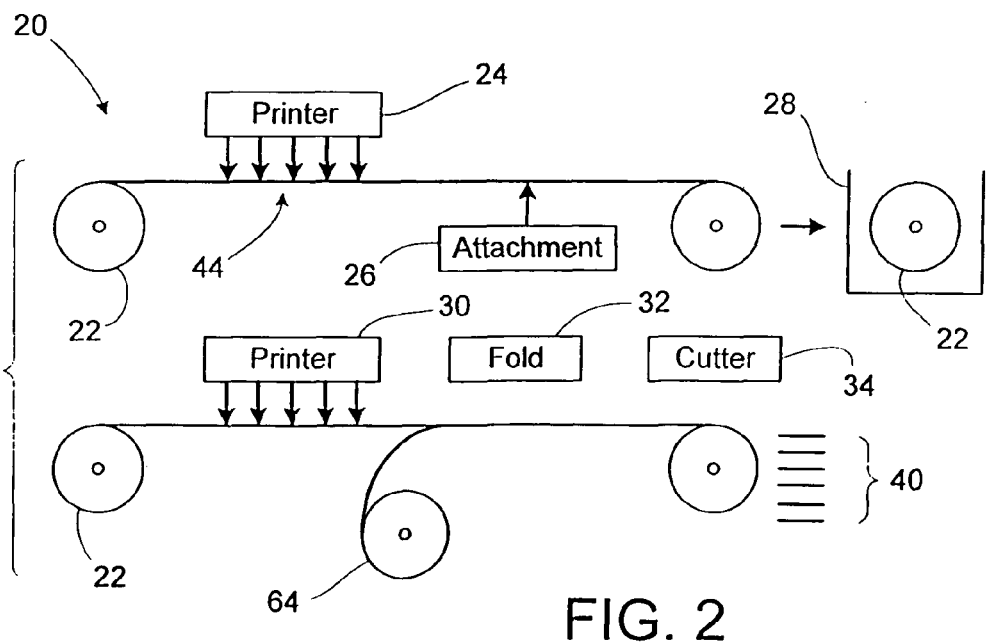
FIG. 2 is a schematic diagram of a system for carrying out the method of FIG. 1.

FIG. 1 shows a high-level flowchart of a first method 10 of making a tag that includes a remotely-detectable device, such as a radio frequency identification (RFID) device. FIG. 2 shows a schematic diagram of a system 20 for carrying out the method 10. FIGS. 3 and 4 show a tag 40 (or a portion thereof) at various steps in the method 10. FIGS. 5-7 show the finished tag 40. The methods and systems are described herein in terms of making of a garment tag, being defined broadly as a tag that may be affixed to a variety of types of apparel, including footwear. However, it will be appreciated that the methods may be used for making other types of remotely-readable devices, such as other types of tags or labels.

In step 12, preprinting is performed to print generic information 42 on a first face of tag portions 44 of a paper roll 22. The paper roll 22 may utilize 10-16 pt. paper, for example. The preprinting is performed by a printer 24, using any of a variety of suitable, well-known printing techniques, such as flexo printing. The generic information 42 may include any of a variety of information that is to be included on each of the tags 40, and does not need to be customized or varied for each individual tag. Examples of the generic information 42 include logos, decorative elements, and notices, instructions, or warnings about the presence of an RFID device in the tag 40.

The printing operation may be combined with coating a second face of the portions 44 (on an opposite side of the portions from the first face) with an adhesive layer 46. The adhesive layer 46 may be any of a variety of suitable adhesives, such as well-known pressure sensitive adhesives (PSAs).

In step 14 an RFID device 48 is attached to the second face of the portion 44 by an attachment device 26, being secured to the portion 44 by the adhesive layer 46. The RFID device 48 is secured on the second face at a location underneath where the generic information 42 is printed on the first face. This is done to avoid locating the RFID device 48 at a location underneath a blank area 50 where individualized information will be printed in a later step. By avoiding printing over an area where the RFID device-is mounted, the risk of damage to the RFID device may be reduced.

The RFID device 48 includes an RFID chip 54 coupled to an antenna 56. The operative parts of the RFID device 48 may be mounted on a suitable substrate 58, such as a suitable polymer substrate. The RFID device 48 is configured for at least remote detection by a suitable reader. It will be appreciated that the RFID device 48 may be any a variety of remotely detectable devices of varying complexity. The RFID device 48 may store additional information, such as a serial number or other identifier that may be associated with product characteristics. In addition, the RFID device 48 may have the additional capability of having information remotely stored upon it, allowing a reader/writer to interact with the RFID device 48 to store information in the RFID device 48. In addition to the components shown for the RFID device 48, it will be appreciated that the RFID device 48 may have additional suitable components, such as batteries or other energy storage devices.

Following preprinting of the generic information 12, and attachment of the RFID devices 48, the roll 22 may be rewound and stored at a location 28 until completion of the tags 40 is desired. The location 28 may be a suitable location such as a warehouse or other storage facility, where the paper roll 22 of the partially-completed tags 40 is kept. There are cost advantages to partially fabricating the tags 40 in large runs at a central location, and completing the tags 40 at another location and/or at another time, for example at a place and time when the actual completed tags 40 are to be affixed to merchandise.

It will be appreciated that a paper roll 22 of the partially-completed tags 40 is less costly to transport and store than a roll of partially-completed tags on a heavier material, such as cardstock. In addition, should there be a need to scrap partially-completed tags, it will be appreciated that discarding partially-completed tags on a relatively-inexpensive paper roll represents less of a loss than discarding partially-completed tags on relatively-expensive cardstock.

When completion of the tags is desired, the paper roll 22 is removed from the storage location 28. In step 16, individualized information 60 is printed in the blank area 50 of the first (front) face of the paper roll portion 44, using a second printer 30. The individualized information may include information corresponding to a particular garment or other object to which the tag is to be attached. Examples include the size, color, or style of the garment. The information may be human readable an/or computer readable. For example, the individualized information may be in the form of alphanumeric characters, symbols, bar codes, etc. The other information may also include an identifier regarding the particular security device that is part of the tag, for example a serial number corresponding to the particular RFID device.

Although the preprinting step 12 of the generic information 42, and the printing step 16 of the individualized information 60, are shown as involving different print operations with different printers at different locations and at different times, alternatively the print operations may be performed at the same time, at the same location, and/or with the same printer.

After the printing of the individualized information 60, the paper roll 22 may be folded over card stock 64, in step 17. The folding step 17 may be performed by machine or by hand at a folding station 32. The adhesive layer 46 on the back side of the portions 44 of the paper roll 22 serves to adhere the portions 44 to both faces of the cardstock 64.

In step 18 the completed tags 40 are separated from the paper roll 22 and from each other, at a cutting station 34. A die cutter, cutting wheel, laser cutting device, or other suitable cutting device may be used to singulate the tags 40, while the tags are still coupled to the carrier material. The cutting may also include placing a hole or notch 70 in the tag 40, for example to aid in attaching the tag 40 to an object such as a garment. The completed tags 40 may then be attached to individual garments or other objects to be tracked.

Many of the operations described above are shown as part of one or more roll-to-roll processes. It will be appreciated that such operations may be performed in other than roll-to-roll processes.

In addition, it will be appreciated that the order of the above operations may be altered somewhat from that shown. For instance, it may be possible to separate the individual paper tag portions 44 from the paper roll 22 before attaching the tag portions 44 to individual pieces of cardstock, or to a continuous feed of cardstock.

It will be appreciated that many variations are possible regarding the above method. For example, the RFID device 48 may be located so that it is visible in the finished tag 40, rather than being embedded in the middle of the tag 40.

The above method presents many advantages over methods that involve preprinting on cardstock. It is easier to print on paper than on cardstock. Since paper is a lighter, less bulky, and cheaper material than cardstock, the cost of transporting and storing partially-completed tags is reduced. Further, the cost invested in partially-completed tags is smaller, resulting in less of an investment in inventory of partially-completed tags, and resulting in less of a loss if partially-completed tags are discarded.

FIG. 8 shows steps of a second method 110 for making an RFID tag. FIG. 9 shows a schematic diagram a system 120 for carrying out the method 110, and FIGS. 10 and 11 illustrate the resulting RFID tag 140.

In step 112, a pair of facestock streams 142 and 144 are prepared. The first facestock stream 142 has generic information 146 printed thereon, and the second facestock stream 144 has individualized information 148 printed thereon. The printings of the facestock streams 142 and 144 may occur in separate printers 122 and 124, which may be printings at separate times, and in separate locations. RFID devices 150 are attached to the first facestock stream 142, for example being adhesively attached by an attachment mechanism 126 to an underside of the first facestock stream 142, for example using a PSA, such as described above in the method 10. The facestock streams 142 and 144 may be made of suitable paper and/or cardstock.

In step 114 the individualized information 148 is electronically inspected at an inspection station 130. The individualized information 148 may be electronically inspected to verify print quality and/or content. Some mechanism may be provided to avoid attaching the facestreams 142 and 144 together in instances where the individualized information 148 fails to pass inspection. It will be appreciated that the inspection is optional, and may be omitted if desired.

In step 116 the facestreams 142 and 144 are joined together, for example by laminating the facestreams 142 and 144 together between a pair of rollers 132. It will be appreciated that many alternatives exist for joining together the facestreams 142 and 144 (or portions thereof), some of which do not involve roll-to-roll methods. If a printed unit failed inspection, the unit could be diverted from the lamination pathway by various methods such as temporary diversion of the web pathway.

Finally, in step 118 a cutter 134 is used to separate the completed tags 140 from one another. The finished tags 140 may then be attached to garments or other objects.

The method 110 allows good side-to-side print registration to be obtained. The method 110 also advantageously avoids extra scoring of the card stock to yield a clean fold, which is a feature of at least some current methods. Also, it avoids problems that might occur when the fold is not perfect and yields poor side-to-side registration.

Figure 12:
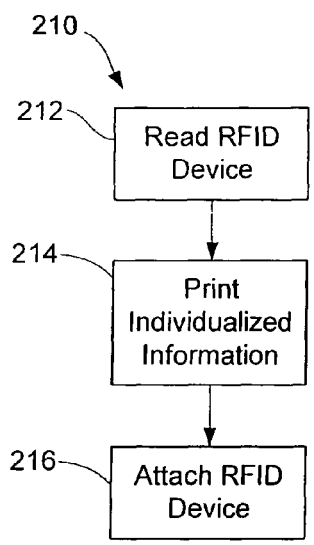
FIG. 12 is a high-level flowchart of steps of a third method of making an RFID tag, in accordance with the present invention.
Figure 13:
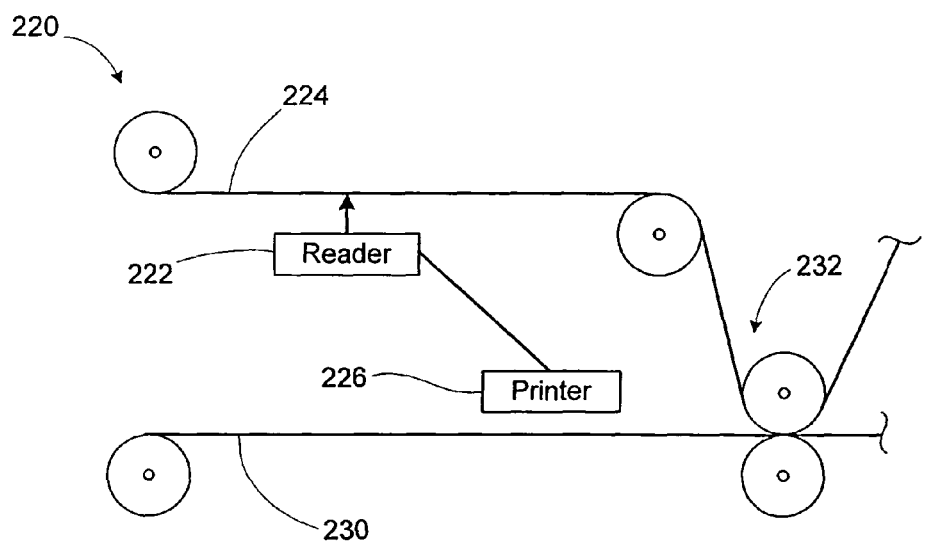
FIG. 13 is a schematic diagram of a system for carrying out the method of FIG. 12.
Figure 14:
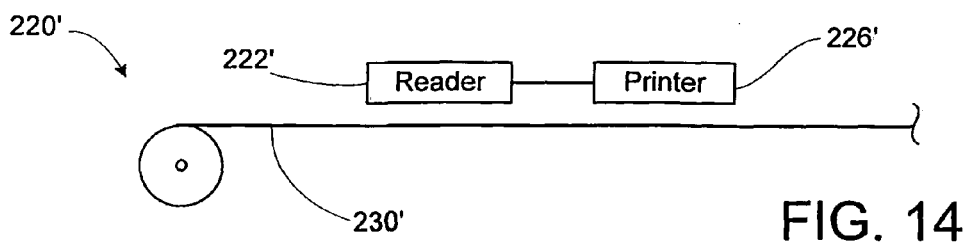
FIG. 14 is a schematic diagram of a system for carrying out an alternative method similar to the method of FIG. 12.

FIG. 12 shows steps of a third method 210 for making an RFID tag, while FIGS. 13 and 14 show a pair of systems 220 and 220' system for carrying out the method 210 and a variant of that method. In step 212 of the method, an RFID device is interrogated by a reader 222. The RFID device is one of a series of similar such devices on a web 224 of RFID devices. The reader 222 is capable of extracting information from the RFID device, such as a serial number of the device. The reader 222 is coupled to a printer 226, which utilizes information obtained from the reader 222 in printing individualized information on a roll 230 of paper or cardstock being fabricated into the tags, in step 214. Then in step 216, the RFID devices are attached to the roll 230, at an attachment location 232. The attachment is made at a location corresponding to the printing of the individualized information printed earlier on the roll 230. A pressure sensitive adhesive (PSA) may be utilized in attaching the RFID devices to the roll 230.

The method 210 and the system 220 allow interrogation to of the RFID devices to provide correct information for the printing of the individualized information. Other steps of the method 210 have been omitted, for example steps involving printing of generic information, inspecting the printed information, folding, laminating, and/or cutting.

It will be appreciated that many alternatives exist for using a reader to interrogate RFID devices to provide information for correct printing of individualized information. One alternative arrangement is shown in FIG. 14, which schematically shows a system 220' which interrogates RFID devices already attached to a roll 230', prior to printing individualized information on corresponding locations on the roll 230'. The system includes a reader 222' for interrogating the RFID devices, and a printer 226' for printing the individualized information.

Another alternative to provide the printer 226 or 226' with information on the RFID devices from another source, such as from an earlier interrogation of the devices at another location, or from information obtained during manufacture and/or programming of the RFID devices. Such information may be provided to the printer 226 or 266' by any of a variety of suitable devices, such as by a computer readable medium such as a hard drive, data link, or optical disk.

FIG. 15 is a flowchart of a fourth method 310. A system 320 for carrying out the method 310 is shown in FIG. 16, and FIG. 317 shows a tag 340 that is produced using the method 310.

In step 312 various layers are laminated onto a carrier material 322. The layers include a preprinted graphic layer 342, an RFID inlay layer 344, an optional cardstock layer 346, and a printable facestock 348. The graphic layer 342 may be printed paper or cardstock layer having generic information printed thereupon. Examples of suitable materials for the graphic layer 342 include FASSON 60# Matte Litho Spec. 12906/12913 and FASSON 60# Semi Gloss Spec. 15335/18658. The RFID inlayer layer 344 is a web containing RFID devices, for example on a 2 mil PET layer. The printable facestock 348 may be made of a material that is printable by a thermal printing process. An example of a suitable material for the facestock is FASSON TT1C. The layers 342-348 may be coupled together by a suitable adhesive, such as layers of suitable adhesive placed between the various layers 342-348. Examples of suitable adhesives include FASSON 2501 and FASSON C2500. All of the FASSON products mentioned herein are available from Avery Dennison Corporation. A non-tacky adhesive may be used to secure the laminate of the layers 342-348 to the carrier material 322. The carrier material could be any suitable web stock (i.e., paper, polymer film, foil, etc). A pair of rollers 324 may be used to laminate the layers 342-348 together, and to the carrier material 322.

In step 314 a cutter 326 is used to die cut material around the individual tags 340, while leaving the tags 340 affixed to the carrier material 322, as illustrated in FIG. 17. The carrier material 322 enables the die cut tags 340 to run through a printer 328 in step 316, which allows printing of individual information on the facestock 348. The printing may be by thermal transfer printing, which does not press against and possibly damage the RFID device in the inlay layer 344 below the facestock layer 348.

Finally, in step 318, the individual finished tags 340 are peeled from the carrier material 322 by use of a peeler 330. The peeler 330 may be a sharp-edged plate or other suitable device. The tags 340 may then be attached to garments or other objects.

It will be appreciated that concepts or features that have been described with regard to one of the methods may be employable in other of the methods. That is, features of the various methods may be advantageously combined with one another. For instance, usable with any of the above methods is the concept of method 210 of interrogating RFID devices to provide information for printing individualized information. Many other combinations of advantageous features of the various methods are possible, and are intended to be embraced by this description.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making an RFID tag, the method comprising:
    preparing a paper roll material, the preparing including:
        printing first information on a first face of the roll material; and
        attaching a plurality of RFID devices to an opposite face of the roll material;
    after the preparing, printing second information on the first face of the roll material; and
    folding portions of the paper roll material around portions of cardstock, with the first and second information on respective opposite faces of the resulting tag.

2. A method of making an RFID tag as recited in claim 1, the method further comprising:
    before the folding, preparing a pair of printable facestocks, printing on one side of each of the pair of printable facestocks, and
    interrogating one of the plurality RFID devices;
    printing individualized information on the one side of the pair of printable facestocks based on the step of interrogating; and
    inspecting the individualized information.

3. A method of making an RFID tag as recited in claim 1, the method further comprising:
    before the folding obtaining identifier information from one of the plurality of RFID devices;
    printing individualized information on a facestock, wherein the individualized information is at least in part a function of the-identifier information obtained from the one RFID device;
    attaching the one RFID device to the facestock after the individualized information is printed on the facestock;
    inspecting the individualized information; and
    diverting the facestock with the one RFID device if the individualized information fails to pass inspection.

4. The method of claim 3, wherein the one RFID device is attached to a second facestock prior to the obtaining.

5. A method of making an RFID tag as recited in claim 1, the method further including:
    before the folding laminating plural layers to a carrier material of the paper roll material, the plural layers including the plurality of RFID devices, a layer having preprinted information and a printable facestock;

cutting the plural layers to produce plural tags on the carrier material with each of the plural tags having preprinted information:
printing individualized information on the facestock;
inspecting the individualized information on the facestock;
separating the tags from the carrier material: and
diverting a portion of the tags that fails to pass inspection.

6. The method of claim 5, wherein the printing includes thermal printing.

7. The method of claim 5, wherein the separating includes peeling the tags from the carrier material.

8. The method of claim 5, wherein the method includes one or more roll-to-roll processes.

9. The method of claim 5, wherein the tag is a garment tag.

10. A method of making a garment tag, the method including;
providing a partially completed roll of tags, the roll having discrete section defining individual tags;
applying first information on a first face of the roll of tags;
providing an RFID device;
inserting the RFID device in the partially completed roll of tags;
attaching the RFID device to an opposite face of the roll of tags;
obtaining individualized information relating to a garment;
applying the individualized information to the partially completed roll; and
folding portions of the roll of tags around portions of cardstock, with the first individualized information on respective opposite faces of the resulting completed tag.

11. The method of claim 10, further comprising attaching the completed tag to the garment.

12. The method of claim 10, wherein the individualized information includes a characteristic of the garment selected from the group consisting of a size of the garment, a color of the garment, and a style of the garment.

13. The method of claim 10, wherein the completed tag includes indicia relating to the RFID device being present.

14. The method of claim 10, including a further step comprising inspecting the completed tag to determine if the RFID device is present.

15. The method of claim 1, wherein the printing includes thermal printing.

16. The method of claim 1, wherein the resulting tag is a garment tag.

* * * * *